United States Patent [19]
Nishijima et al.

[11] Patent Number: 5,316,822
[45] Date of Patent: May 31, 1994

[54] COVER FOR VEHICULAR AIR BAG

[75] Inventors: Kazuyoshi Nishijima; Kazuo Inaba, both of Fuji, Japan

[73] Assignee: Nihon Plast Co., Ltd., Fuji, Japan

[21] Appl. No.: 917,329

[22] Filed: Jul. 23, 1992

[30] Foreign Application Priority Data

Jul. 23, 1991 [JP] Japan .................................. 3-182390
Sep. 30, 1991 [JP] Japan .................................. 3-251448

[51] Int. Cl.⁵ .............................................. B32B 3/10
[52] U.S. Cl. .................................. 428/138; 156/244.25; 156/245; 264/45.5; 264/46.4; 264/46.6; 264/212; 264/216; 264/297.2; 280/728 R; 280/732; 428/136; 428/137; 428/215; 428/216; 428/218; 428/423.3
[58] Field of Search ...................... 428/423.3, 136, 137, 428/138, 215, 216, 218; 280/732, 728; 264/328.1, 45.5, 46.4, 46.6, 212, 216, 297.2; 156/244.25, 245

[56] References Cited
U.S. PATENT DOCUMENTS

| | | | |
|---|---|---|---|
| 4,120,516 | 10/1978 | Takamatsu et al. | 280/728 |
| 4,246,213 | 1/1981 | Takamatsu et al. | 264/46.7 |
| 4,836,576 | 6/1989 | Werner et al. | 280/731 |
| 5,013,065 | 5/1991 | Kreuzer | 280/743 |

FOREIGN PATENT DOCUMENTS

| | | |
|---|---|---|
| 56-48606 | 11/1981 | Japan . |
| 63-199149 | 8/1988 | Japan . |
| 63-232052 | 9/1988 | Japan . |
| 2-171364 | 7/1990 | Japan . |

Primary Examiner—James J. Bell
Attorney, Agent, or Firm—Foley & Lardner

[57] ABSTRACT

An air bag cover for a vehicle has a main body formed of a thermoplastic polyurethane elastomer and a skin layer applied over the main body. The skin layer is preferably of an 'integral skin' reaction type polyurethane and is applied over the main body. Break lines may be formed in the main body portion of the airbag cover for permitting an inflated air bag to rip the cover for emerging into the vehicle cabin. The polyurethane elastomer of the main body preferably has a Shore A hardness rating of over 80.

29 Claims, 5 Drawing Sheets

COVER FOR VEHICULAR AIR BAG

BACKGROUND OF THE INVENTION

1. Field of the Invention

The present invention relates generally to a cover for a vehicle air bag. Particularly, the invention relates to a high safety type cover with optimal hardness of a main body thereof with a pleasing texture and density of an outer skin thereof and which will not fragment when breaking pressure is applied by an inflated air bag when the air bag is activated.

2. Description of the Prior Art

Conventionally, air bag cover arrangements are known utilizing a substantially soft material for covering the air bag such as polyurethane foam, for example. Such covers usually employ tear lines, or break lines arranged to allow the cover to open appropriately upon activation of the air bag.

Such conventional air bag covers are taught in Japanese Utility Model 56-48606, wherein a low density polyurethane foam may be utilized for a core portion, or main body, and a high density polyurethane foam utilized as a surface, or outer skin portion, the high and low density portions being joined together for forming as a single cover. Japanese Patent Application First Publication 63-199149 teaches using an insert of polyamide, polychloride vinyl, polyolefin, in a synthetic resin cover. Japanese Patent Application First Publication 63-232052 teaches a cover having an interior layer of polyamide and a jacket layer of polyurethane foam. However, using such techniques as described above in multi-layer arrangements, manufacturing thereof becomes complicated, also optimal adhesion is not present between the surfaces of the insert and the jacket layer.

In such conventional covers utilizing a variety of synthetic resins as set forth above, an adhesion strength between the core layer and the surface, or jacket layer, must be sufficient to prevent separation of the layers when the cover is in use installed in a vehicle. In order to increase the adhesion between the layers of such a cover, a plurality of small holes are formed in the core layer. However, in such a cover, when the air bag is inflated, tearing of the layers can diverge from a predetermined tear line. Further, in such conventional arrangements, when a core layer and a jacket layer are both formed of polyurethane foam, though sufficient adhesion may be present between the layer, both layers may bead up upon tearing and be introduced to a passenger compartment upon activation of the air bag.

Japanese Patent application First Publication 2-171364 discloses a cover wherein an insert or core is not utilized but the cover is formed integrally of a thermoplastic elastomer. Relief portions are defined in the elastomer for defining tear lines. However, since the relief portions for defining the tear lines must be formed in continuous fashion, an area in which the relief portions are formed becomes rather large. The cover is thus subject to cracking, or other damage as exposed to light and heat in the course of vehicle use. Further, such damage may degrade proper tearing along the break lines when the air bag is activated and the above mentioned drawback is present in that small pieces of the material may be widely spread in the passenger cabin upon opening of the cover.

SUMMARY OF THE INVENTION

It is therefore a principal object of the present invention to overcome the drawbacks of the prior art.

It is a further object of the present invention to provide a high safety air bag cover in which small pieces thereof will not be scattered upon tearing of the air bag cover.

In order to accomplish the aforementioned and other objects, an air bag cover for a vehicular air bag is provided, comprising: a main body formed of an ester type, ether type, or ether carbonate type thermoplastic polyurethane elastomer having a Shore A hardness of at least 80, formed in a predetermined shape by injection molding; a skin layer disposed over the main body and formed of a polyurethane based material having a thickness of at least $15\mu$.

DESCRIPTION OF THE PREFERRED EMBODIMENT

Figure 1:
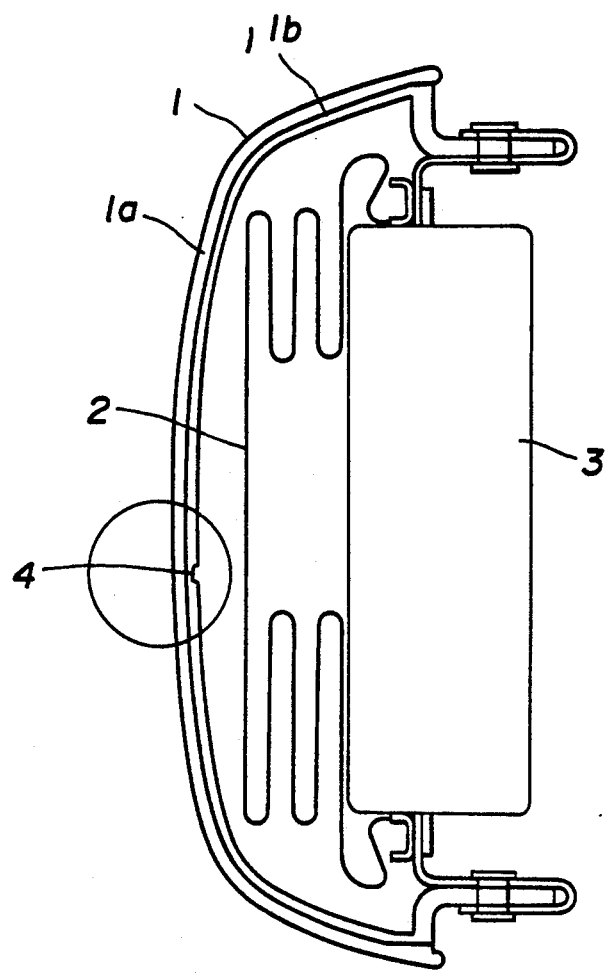
FIG. 1 is a cross-sectional view of an air bag module with an air bag and cover installed taken along line I—I of FIG. 2.

In formulating the present invention, the inventors thereof, through experimentation, have determined a thermoplastic polyurethane elastomer as a preferable material for forming a main body of an air bag cover by injection molding. Further, a polyurethane base material may be applied in addition.

The material for making the present invention is selected from ester type, ether type or ether carbonate type materials, particularly thermoplastic polyurethane elastomers having a Shore A hardness rating of 80 or above which can be injection molded into an appropriate shape for a main body of an air bag cover.

Also preferable are thermoplastic polyurethane elastomer having room temperature flexural modulus of elasticity of 1000–6000 $Kg/Cm^2$ and a flexural modulus of elasticity of 2000–12000 $Kg/Cm^2$ at $-30°$ C.

Further, for establishing sufficient hardness and moldability, an ester type, ether type or ether carbonate type thermoplastic polyurethane elastomer is required. Utilizing such a thermoplastic polyurethane elastomer type material, a vehicle airbag is adequately protected under vehicle atmospheric environments even at very high or very low temperatures.

Applied to the core, or main body, is a layer of polyurethane based material, in liquid form for example, having a thickness of $15\mu$ or greater.

The applied layer of polyurethane 'paint', has sufficient adhesive strength for bonding to the thermoplastic polyurethane elastomer layer and such steps as application of primer, etc., are not required. For the skin layer, a polyurethane comprising acrylpolyol modified by epoxy resin and amine type hardener or polyamideamine hardener modified by epoxy resin may also be preferably employed.

Further preferable is an 'integral skin' reaction type polyurethane of a density of 0.1-0.9 for forming the skin layer over the core, or main body portion of the thermoplastic polyurethane elastomer air bag cover.

The painted layer may be applied by any means, such as spray, or other means of application. The thickness of the application may be 50-70$\mu$ in 'soft-feel-paint', 15-50$\mu$ in collagen-filled soft-feel-paint, and 20-60$\mu$ in blowing agent filled paint.

Also, by covering the main body of the air bag cover with the polyurethane based layer, the main body is suitably protected against light and/or heat present in a vehicle. Further, when subjected to variation in temperature and/or variation in light intensity over long periods of use, the thermoplastic polyurethane elastomer air bag cover according to the invention has sufficient resiliency and flexibility to withstand such conditions. Thus, the above described composition has optimal characteristics for reliably and durably forming an air bag cover.

In addition, on selection of materials, other factors such as hardness and moldability should be considered.

Further, although the main body of the air bag cover of the invention may be formed singly of the thermoplastic polyurethane elastomer, this material may also be combined with fiberglas, talc, resin beads, or with ABS, polyester or polycarbonate for forming an air bag cover from a composite material.

The following Table 1 shows various materials tested for preferable characteristics for forming a main body portion of an air bag cover according to the present invention.

TABLE 1

| Material for Main body, (thermoplastic elastomer) | Adhesion strength of outer layer | Hardness | Moldability | Overall suitability |
|---|---|---|---|---|
| POLYURETHANE | A | A | B | A |
| POLYETHYLENE | D | C | B | C |
| PP | D | D | A | D |
| ABS | B | C | B | C |
| Soft PVC | D | B | D | D |
| Hard PVC | B | D | B | C |
| POLYESTER | C | B | C | C |
| POLYSTYRENE | B | B | D | C |

The test results are evaluated thusly:
A: highly suitable
B: suitable
C: unsatisfactory
D: highly unsuitable As can be seen from Table 1, the thermoplastic polyurethane elastomer has highly suitable characteristics in all testing categories.

Hereinbelow, a first embodiment of an air bag cover formed of materials as described above, will be described with reference to the drawings.

Figure 2:
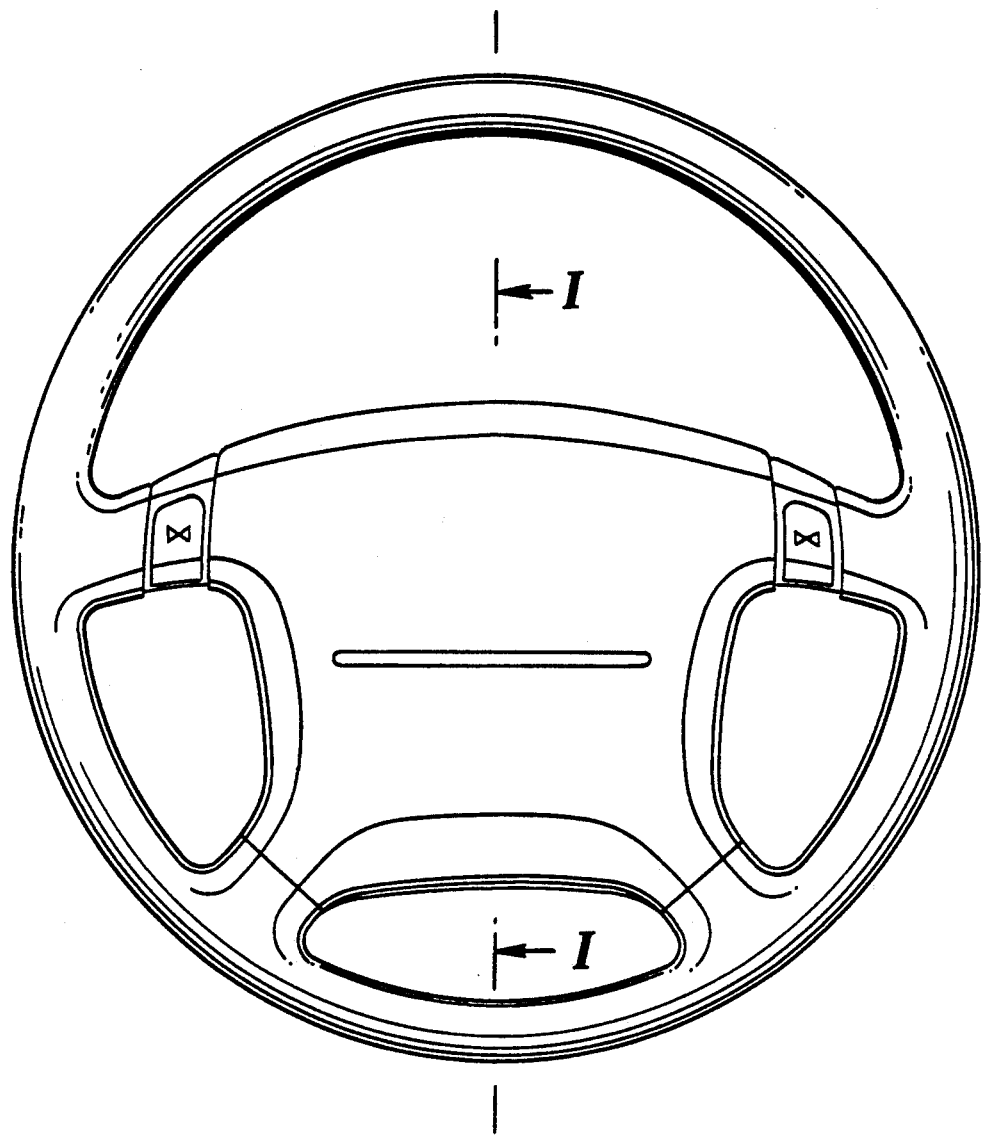
FIG. 2 is a plan view of a vehicular steering wheel incorporating the air bag cover of the invention.

FIG. 2 shows a steering wheel of a vehicle incorporating an air bag cover according to the invention. FIG. 1 shows a cross-section of the steering wheel of FIG. 2, taken along line I—I thereof. As best seen in FIG. 1, the air bag cover 1 comprises an outer skin layer 1a of a polyurethane based material, applied in a liquid state, for example, and a main body portion 1b of thermoplastic polyurethane elastomer. Further, mounted under the airbag cover 1 is an air bag 2, an inflation means 3, such as a gas cartridge or the like, and, defined on the inner surface of the cover 1, a break line 4, or break away portion, is defined.

The above described main body portion 1b may preferably be selected from ester type, ether type or ether type thermoplastic polyurethane elastomer having a Shore A hardness rating of greater than 80 which can be injection molded into an appropriate shape for a main body 1b of an air bag cover. Also, as described above, preferable materials for the main body portion 1b are thermoplastic polyurethane elastomers having a room temperature flexural modulus of elasticity of 1000-6000 Kg/Cm$^2$ and a flexural modulus of elasticity of 2000-12000 Kg/Cm$^2$ at $-30°$ C.

Further, for the skin layer 1a, polyurethane comprising acrylpolyol modified by epoxy resin and amine type hardener or polyamideamine hardener modified by epoxy resin may also be preferably employed. Or alternatively, as described above, an 'integral skin' reaction type polyurethane may be utilized for forming the skin layer over the main body 1b of the thermoplastic polyurethane elastomer air bag cover. The above may have a density of 0.1-0.9.

Referring to FIGS. 3-6, magnified view of various embodiments of a break line according to the invention are shown.

Figure 3:
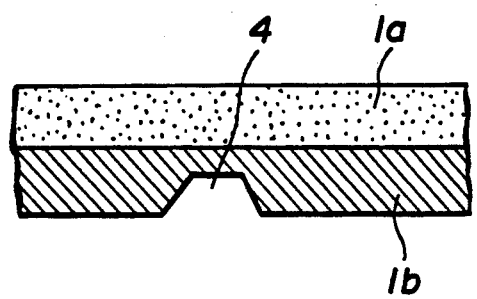
FIGS. 3-5 show different embodiments of tear lines according to the invention.

FIG. 3 shows a break line 4 formed in the main body 1b of the air bag cover 1 exclusively. The upper surface of the break line 4 is parallel with the flat upper surface of the main body 1b and the sides thereof are angled. According to this embodiment the sides may be angled equally or one side may be at a more acute angle than the other for applying breaking pressure to the main body.

Figure 4:
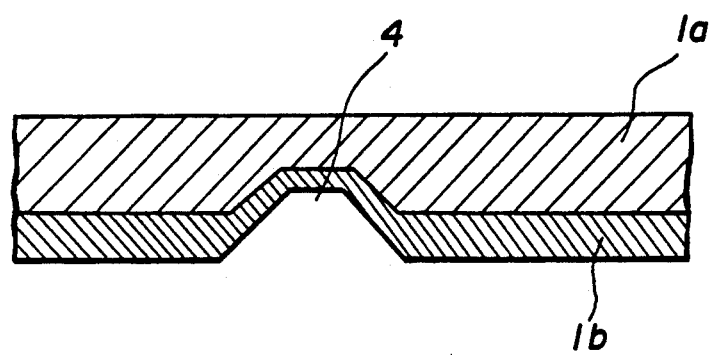

FIG. 4 shows a break line 4 which is defined in the upper surface of the main body 1b such that a relief of the break line 4 is defined in the upper surface of the main body 1b. The shape of the break line may be substantially the same as in the previous embodiment. It will be noted that a thickness of the skin layer 1a is selected so as to be thicker than the projection of the relief of the break line such that the upper surface of the skin layer 1a is flat.

Figure 5:
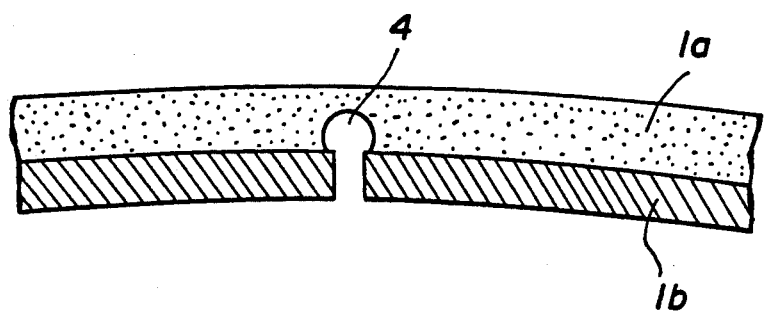

FIG. 5 shows a break line which is defined in both the main body 1b and the skin layer 1a. According to this embodiment, an upper circular break line 4a is defined in the skin layer and a second break line 4b is formed as a cut through portion in the main body 1b, such that the upper circular break line 4a is in communication with the lower through cut 4b. The sides of the cut through portion may be parallel to each other. According to this embodiment, the thickness of the skin layer 1a is selected to be thicker that the upper circular break line 4a such that the upper surface thereof remains flat.

Figure 6:
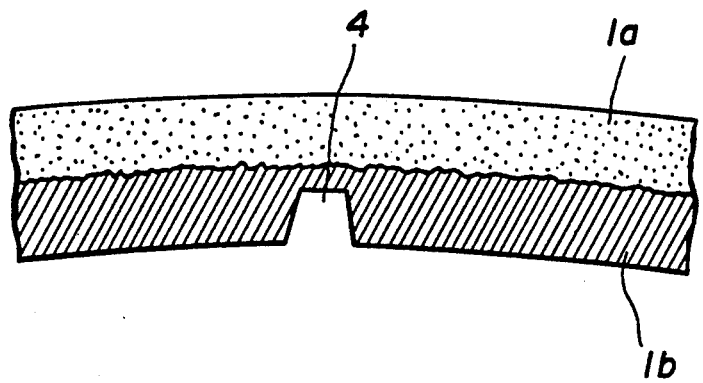
FIG. 6 shows a relationship between a core and jacket portion of an air bag cover including a tear line.

FIG. 6 shows a break line 4 similar to that of the first embodiment described with reference to FIG. 3, except, according to this embodiment, a roughened surface is defined between the skin layer 1a and the main body 1b so as to enhance adhesion between the two layers 1a and 1b.

Figure 7:
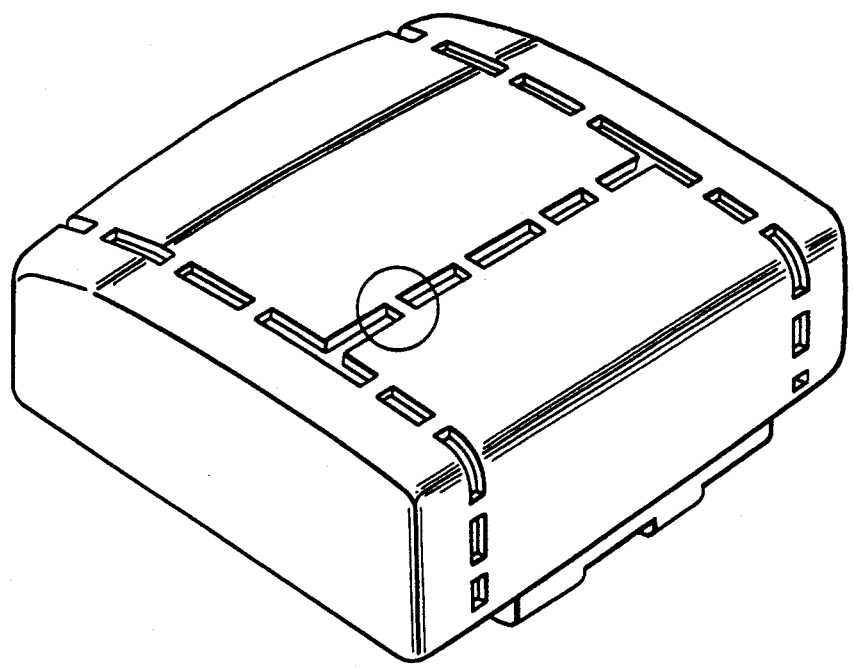
FIG. 7 is a perspective view of a core layer including slits formed along break lines thereof.
Figure 8:
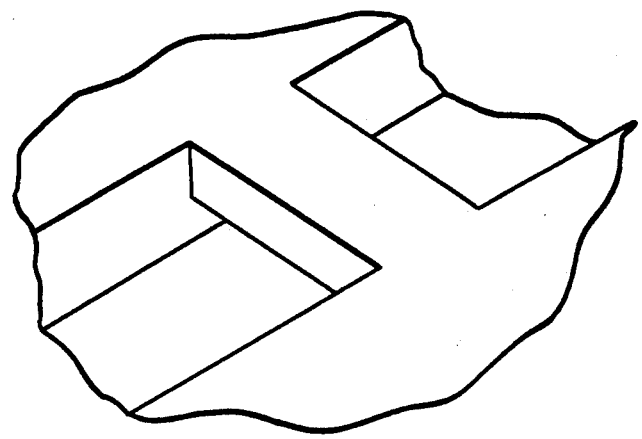
FIG. 8 is an enlarged perspective view of the slits of FIG. 7.

FIG. 7 shows a perspective view of another embodiment of an air bag cover according to the invention. According to this embodiment, perforated lines define the break lines in the main body 1b. The perforations are formed in elongated rectangular shape and a spacing between perforations is selected for allowing suitable breaking performance when subjected to pressure from an inflating air bag for example. FIG. 8 shows an enlarged perspective view of the perforations of FIG. 7. According to this embodiment, a size of the perforations may be selected so as to be small enough to be covered by application of the skin layer 1a.

Figure 9:
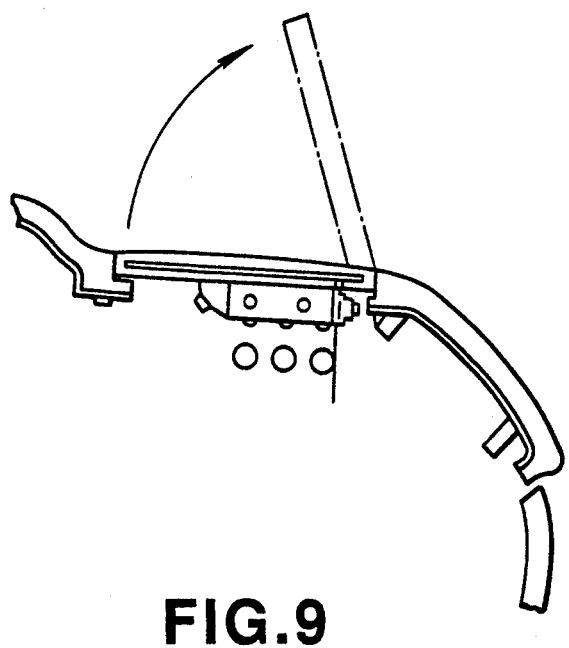
FIG. 9 show a cross-sectional view of an air bag cover for utilization in an instrument panel of a vehicle.

FIG. 9 shows an air bag cover according to the invention installed in an instrument panel of a vehicle. In such an arrangement, since a hinge is provided in mounting the cover, break lines are not required. However, all the advantages set out for the above, break away type cover are also available for a hinged airbag cover.

For forming the air bag cover 1 of the present invention, the thermoplastic polyurethane elastomer may be molded into the appropriate shape for the main body 1b, after which a white gasoline, for example, may be used for removing oily residue from the outer surface of the main body 1b. Then, after drying the main body 1b at a temperature of 40°-50° C., a spray gun, for example, may be used for applying the skin layer 1a to the outer surface of the main body 1b. After application of the skin layer 1a, the air bag cover may be dried at room temperature, or alternatively, dried while heating in a range from 70°-80° C.

To maintain a constant shape of the air bag cover over long periods of use, and to define an outer profile of the air bag cover more precisely, and further to insure that break lines tear without mishap and the the air bag cover opens smoothly, it is preferable to use a thermoplastic polyurethane elastomer having a flexural modulus of elasticity of 1000-6000 Kg/cm$^2$ at room temperature and between 2000-12000 at −30° C.

Thus, according to the above, a highly safe air bag cover can be formed having optimal hardness and a pleasing surface texture which will not scatter in small pieces when the break lines are torn by activation of an air bag. Further, an air bag cover is provided which can durably withstand the environmental extremes of a vehicular passenger cabin.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An air bag cover for a vehicular air bag, comprising:
   a main body formed of an ester type, ether type, or ether carbonate type thermoplastic polyurethane elastomer having a Shore A hardness of at least 80, formed in a predetermined shape by injection molding;
   a skin layer disposed over said main body and formed of a polyurethane based material having a thickness of at least 15μ, adherence between said skin layer and said main body being effected by application of said skin layer over said main body in liquid form so as to induce suitable adhesion between said skin layer and said main body according to at least one of drying and curing of said skin layer.

2. An air bag cover as set forth in claim 1, wherein said skin layer comprises integral skin reaction type polyurethane.

3. An air bag cover as set forth in claim 2, wherein said integral skin reaction type polyurethane has a density between 0.1 and 0.9.

4. An air bag cover as set forth in claim 1, wherein said a flexural modulus of elasticity of said thermoplastic polyurethane elastomer for molding said main body is determined between 1000-6000 Kg/cm$^2$ at room temperature and between 2000-12000 at −30° C.

5. An air bag cover as set forth in claim 1, wherein said skin layer comprises a polyurethane comprising acrylpolyol modified by epoxy resin and amine type hardener.

6. An air bag cover as set forth in claim 1, wherein said skin layer comprises polyurethane comprising acrylpolyol modified by epoxy resin and polyamideamine hardener modified by epoxy resin.

7. An air bag cover as set forth in claim 1, wherein an elongate relief portion is defined in said main body so as to form a break line.

8. An air bag cover as set forth in claim 7, wherein said elongate relief portion is defined in a bottom surface of said main body such that a top portion of said elongate relief portion is parallel to a top surface of said main body and side portions thereof are formed at an angle so as to taper in a direction of said top portion.

9. An air bag cover as set forth in claim 1, wherein an elongate relief portion is defined in said main body and a lower side of said skin layer so as to form a break line, a thickness of said skin layer being determined such that a top surface thereof is essentially flat.

10. An air bag cover as set forth in claim 1, wherein relief portions are formed in both of said main body and said skin layer so as to form break lines, said relief portions of said skin layer communicating with those of said main body.

11. An air bag cover as set forth in claim 10, wherein a thickness of said skin layer is determined such that a top surface thereof is essentially flat.

12. An air bag cover as set forth in claim 1, wherein said main body portion is associated with a hinge and mounted in a vehicle instrument panel.

13. An air bag cover as set forth in claim 1, wherein said main body is mounted on a steering wheel of a vehicle and includes at least one elongate relief portion formed in an upper surface thereof to function as a break line.

14. An air bag cover as set forth in claim 1, wherein said main body has a plurality of elongate rectangular slits arranged so as to form a break line in an upper surface thereof.

15. An air bag cover as set forth in claim 14, wherein a size of said slits is determined so as to be covered by said skin layer according to said application thereof in liquid form.

16. A method of forming an air bag cover for a vehicular air bag, comprising:
   molding a thermoplastic polyurethane elastomer into a predetermined shape to form a main body portion of said air bag cover by injection molding;
   cleaning an outer surface of said polyurethane elastomer;
   at least one of drying or curing said thermoplastic polyurethane elastomer;
   applying a skin layer of polyurethane in liquid form having a thickness of at least 15μ;

drying or curing said skin layer.

17. A method as set forth in claim 16, wherein a step of roughening a surface of said main body is performed before application of said skin layer.

18. A method as set forth in claim 16, wherein said drying of said skin layer is carried out at 50°-70° C.

19. A method as set forth in claim 16, wherein a thickness of said skin layer is between 50-70μ.

20. A method as set forth in claim 16, wherein a thickness of said skin layer is between 15-50μ.

21. A method as set forth in claim 16, wherein a thickness of said skin layer is between 20-60μ.

22. A method as set forth in claim 16, wherein said skin layer is applied by spraying.

23. A method as set forth in claim 16, wherein said skin layer comprises integral skin reaction type polyurethane.

24. A method as set forth in claim 16, wherein said integral skin reaction type polyurethane has a density between 0.1 and 0.9.

25. A method as set forth in claim 16, wherein said a flexural modulus of elasticity of said thermoplastic polyurethane elastomer for molding said main body is determined between 1000-6000 Kg/cm$^2$ at room temperature and between 2000-12000 at −30° C.

26. A method as set forth in claim 16, wherein said skin layer is formed of a polyurethane comprising acrylpolyol modified by epoxy resin and amine type hardener.

27. A method as set forth in claim 16, wherein said skin layer is formed of polyurethane comprising acrylpolyol modified by epoxy resin and polyamideamine hardener modified by epoxy resin.

28. A method as set forth in claim 16, wherein said main body portion is formed with a plurality of elongate rectangular slits arranged so as to form a break line, whereby said main body is caused to break open along said break line in response to pressure applied by inflation of said vehicular air bag.

29. A method as set forth in claim 16, wherein said drying of said main body is carried out at a temperature of 40°-50° C.

* * * * *